Sept. 8, 1970 C. S. L. BAKER ET AL 3,527,744
VULCANIZATION OF RUBBER WITH COMPLEX OF MONOCHLOROBORANE
AND TERTIARY AMINE OR TRIPHENYL PHOSPHINE
Filed May 9, 1968
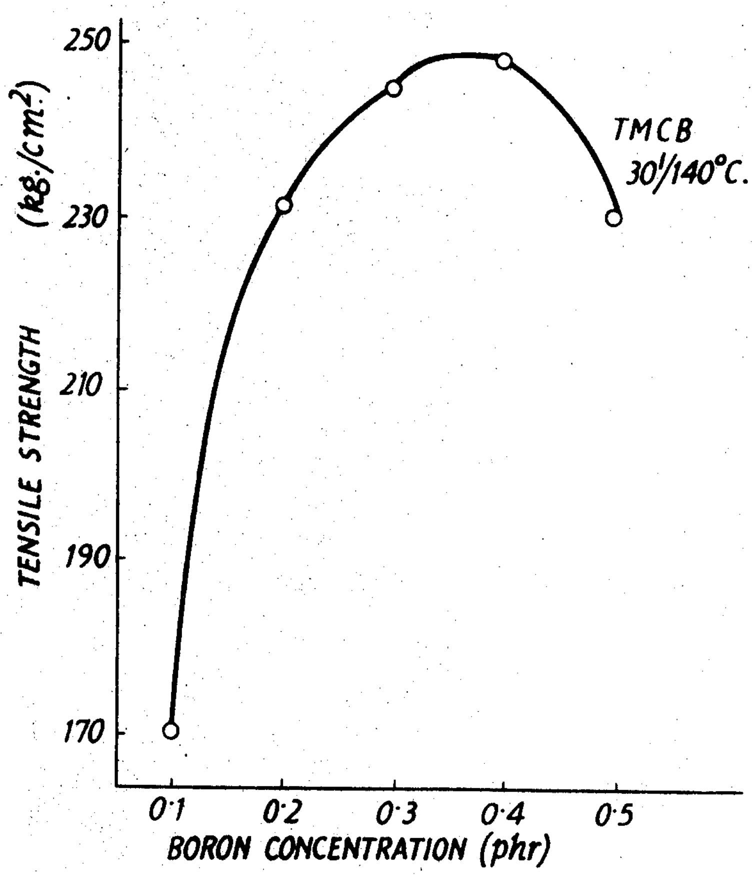
CRISPIN STUART LEWORTHY BAKER.
DOUGLAS BARNARD.
MAURICE READ PORTER. INVENTORS
By. Wenderoth. Lind & Ponack.
Attorneys United States Patent Office | 3,527,744 | Patented Sept. 8, 1970

1

3,527,744

VULCANIZATION OF RUBBER WITH COMPLEX OF MONOCHLOROBORANE AND TERTIARY AMINE OR TRIPHENYL PHOSPHINE

Crispin Stuart Leworthy Baker, Epping, Douglas Barnard, Welwyn Garden City, and Maurice Read Porter, Stevenage, England, assignors to The Natural Rubber Producers' Research Association, London, England, a British body corporate Filed May 9, 1968, Ser. No. 727,903
Claims priority, application Great Britain, May 11, 1965, 21,894/65
Int. Cl. C08f *15/40, 27/08*
U.S. Cl. 260—80.78 6 Claims

ABSTRACT OF THE DISCLOSURE

Chloroborane complexes are used as vulcanizing agents for natural rubbers and synthetic rubbers produced by solution polymerisation, particularly cis-polyisoprene. When the vulcanizable mixture contains moisture, hydrogen evolution may be avoided by the addition of a drying agent such as calcium oxide. The products show a high degree of resistance to attack by ozone making them useful as coatings for conventional rubber articles.

This invention is concerned with the vulcanization of rubber, and relates to vulcanizable compositions comprising natural or certain synthetic rubbers, together with vulcanizing agents and other additives.

U.S. Pat. No. 2,558,559 teaches that boron hydrides are advantageous vulcanizing agents for two specific classes of synthetic rubbers, namely, certain co-polymers of butadienes and acrylonitriles, and polymers of 2-chlorobutadiene-1,3, and states that boron hydrides also have some vulcanizing effect on other rubbers, particularly butadiene-styrene rubber and natural rubber. According to the United States patent, the boron hydride may be used in the form of a complex with ammonia or with certain amines, or in the form of other derivatives. When the uncomplexed boron hydride is used, it is preferably added in admixture with an inert filler, for example, calcined clay, to reduce its inflammability.

We have found that, although boron hydride complexes are capable of vulcanizing rubbers containing olefinic unsaturation, the process may be handicapped by the evolution of gas during cure, leading to porous vulcanizates.

It is thought that the gas, which has been shown to be mainly hydrogen, is primarily produced by reaction of the borane with small quantities of water present in many of the rubbers;

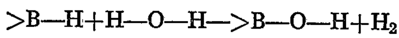

$$>B—H+H—O—H—>B—O—H+H_2$$

In certain cases the addition of a drying agent, the subject of our co-pending application No. 21,895/67 filed on the same day as this one, does not completely eliminate the evolution of gas. Where the rubber contains hydrogen atoms in a suitable configuration to the attached borane grouping, it is believed that hydrogen gas may be evolved by an internal elimination reaction;

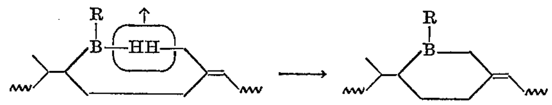

where R is a second rubber chain.

A closely parallel elimination has been reported (H. C. Brown, K. J. Murray, H. Müller and G. Zweifel, J. Am. Chem. Soc. 88, 1443 (1966)).

The present invention provides a vulcanizable composition comprising natural or an olefinically unsaturated synthetic rubber prepared by solution polymerisation, a minor proportion of a chloroborane complex as a vulcanizing agent for the rubber, and optionally a drying agent. A drying agent is desirable when the rubber contains substantial amounts of moisture.

2

It is believed that the replacement by a chlorine atom of one of the three hydrogen atoms attached to boron prevents the internal elimination reaction described above from taking place. Rubbers which contain hydrogen atoms reactive in the above sense include natural and synthetic cis-polyisoprene, and the invention is particularly advantageous in respect of such rubbers.

The vulcanizable composition should preferably not contain any substantial quantity of any non-rubber (other than water) which is reactive towards the chloroborane with or without gas evolution. Natural rubber normally contains some acidic material, but the proportion may be found to be so small that no noticeable evolution of gas takes place on vulcanization. The synthetic rubber is one produced by solution polymerisation. Examples of synthetic rubbers which are produced by this method are: 1,4-polybutadiene, for example the high-cis product sold by Phillips Petroleum International Corporation under the trade name "Cis-4"; polyisoprene, for example, the high-cis product sold by Goodyear Tire and Rubber Company under the trade name "Natsyn"; styrene-butadiene co-polymers, for example, that sold by Phillips Petroleum International Corporation under the trade name "Solprene"; and ethylene-propylene terpolymers such as that sold by E. I. du Pont de Nemours and Company Incorporated under the trade name "Nordel."

Synthetic rubbers produced by emulsion polymerisation do not normally give attractive vulcanizates when chloroborane complexes are used, and gas evolution may be observed. Emulsion polymers normally contain a substantial proportion, for example 5%, of fatty acids and soaps present as surface-active agents, and it is believed that these react with the chloroborane complex to give hydrogen.

The term "chloroborane complex" is intended to include complexes of monochloroborane, $BH_2Cl$, with any complexing agent which does not itself react with the borane. The complexes may be readily formed, for example with amines, phosphines or phosphites. Examples are trimethylamine-chloroborane $(CH_3)_3N:BH_2Cl$, triethylamine-chloroborane $(C_2H_5)_3N:BH_2Cl$, tri-ethylenediamine-bischloroborane $$ClH_2B:N\begin{matrix} CH_2CH_2 \\ —CH_2CH_2— \\ CH_2CH_2 \end{matrix}N:BH_2Cl$$

tri-n-butylamine-chloroborane $(C_4H_9)_3N:BH_2Cl$, and triphenylphosphine-chloroborane $(C_6H_5)_3P:BH_2Cl$. Complexes with sulphur- and oxygen-containing compounds may be less stable.

The purpose of the complexing agent is to enable the chloroborane to be handled safely and conveniently at ambient temperatures. The nature of the complex influences the temperature at which vulcanization takes place, so the choice of a suitable complexing agent may be dictated by the desirability of performing vulcanization at temperatures above those likely to be reached when the components undergo the normal mixing processes.

The free amine is liberated from the complex during vulcanization. Volatile amines, such as trimethylamine, have unpleasant odours and may cause swelling of the vulcanizates. Complexes of the higher amines with bulky alkyl groups, such as tributylamine, tend to be too reactive and to cause premature vulcanization. The bis-chloroborane complex of triethylenediamine has been found to be particularly suitable and has the added advantage of having a high boron content. Examples of other complexing agents will be apparent to those skilled in the art. Complexes of chloroboranes may be prepared by: (i) the method described by J. E. Douglass in J. Org. Chem. 31, 962 (1966), except that in the case of the triethylenediamine complex, N,N-dimethylformamide is used as solvent; or (ii) exchange reactions of the type described by R. A. Baldwin and R. M. Washburn, J. Org. Chem. 26, 3549 (1961), carrying out the exchange with simple chloroboranes prepared as in (i) above.

The amount of the chloroborane complex required to effect vulcanization may readily be determined by experiment, depending on the nature of the rubber, the time and temperature of cure, and the degree of crosslinking required. Suitable proportions may provide from 0.05% to 0.5%, particularly from 0.2% to 0.4% by weight of boron on the weight of the rubber to be vulcanized.

The drying agent, when present, should be one which reacts chemically with moisture present in the rubber to give a product which is substantially unreactive towards the chloroborane. Conventional drying agents, such as synthetic zeolites, magnesium sulphate and calcium sulphate hemihydrate, are relatively ineffective because they hold the moisture only physically or as water of crystallisation. Phthalic anhydride is also ineffective because, although it reacts with water, it gives a product, phthalic acid, which itself reacts with the chloroborane. A preferred drying agent is calcium oxide, either as such, or in the form of a 75% w./w. dispersion in mineral oil as sold by John and E. Sturge Ltd., under the trade name of "Caloxol C31."

Enough of the drying agent should be present to react with all the moisture (if any significant amount is present) in the rubber. When the rubber contains moisture, an improvement is observed when 2 phr. of drying agent is present, and proportions of from 4 to 10 phr. are adequate for use with all such rubber mixes. It has been found convenient when a drying agent is required, to use 6 parts by weight of Caloxol C31 per 100 parts by weight of rubber. Some synthetic rubbers do not contain appreciable amounts of moisture, and a drying agent may therefore not be required.

Conventional fillers, plasticisers, synthetic resins and other desired compounding ingredients may be included in conventional proportions in the vulcanizable compositions of this invention provided that they are inactive towards the chloroborane.

The invention also provides a method of vulcanizing a natural or synthetic rubber, which method comprises heating the vulcanizable composition hereinbefore defined for a time and at a temperature to effect vulcanization. Heating times of from 10 minutes to 1 hour at temperatures of from 120° C. to 150° C. have been found convenient, but other times and temperatures may be chosen. As no induction period is observed when curing with chloroborane complexes, it is preferred to introduce the vulcanizable composition into a mould which has been preheated to a temperature of not less than 20% C. below the minimum practical cure temperature.

Vulcanizates prepared according to this invention show unusual properties in that they exhibit a high degree of stress relaxation and a high creep rate. It is thought that this is not due to insufficient vulcanization, but rather to the fact that a substantial proportion of the cross-links are labile at room temperature. These properties find particular utility in one field. If the initial strains are not too high, the ozone-resistance of these vulcanizates is very good, presumably because the high creep rate rapidly brings the surface strain to below the critical level at which cracking occurs. The invention therefore includes articles of natural or synthetic rubber which have been provided with an ozone-resistant coating or layer of a vulcanizate produced according to the present invention.

The following examples illustrate the invention. In the tables, the following abbreviations have been used:

TEB: Triethylamine-borane
TEDB: Triethylenediamine-bisborane
TPPB: Triphenylphosphine-borane
TMCB: Trimethylamine-chloroborane
TECB: Triethylamine-chloroborane
TEDCB: Triethylenediamine-bischloroborane
TPPCB: Triphenylphosphine-chloroborane
RSS1: Ribbed smoked sheets grade 1
Heveacrumb SMR 5L: Trade name for a technically specified comminuted natural rubber
HAF: High abrasion furnace
SRF: Semi-reinforcing furnace
Dutrex R: Trademark for an aromatic oil used as a processing aid
PBN: Phenylbetanaphthylamine-antioxidant
Phr.: Parts per hundred of rubber Table 1 gives details of various types and proportions of rubber, curing agent, filler, drying agent, various conditions of cure, and some properties of the vulcanizates. The amount of curing agent is given in parts by weight of boron per 100 parts by weight of the rubber. In the filler column, "Yes" means that 50 parts by weight of HAF black have been added per 100 parts by weight of the rubber. In the drying agent column, "Yes" means that 6 parts by weight of Caloxol C31 have been added per 100 parts by weight of the rubber. The curing conditions were as follows:

(A) Composition introduced into a mould preheated to 130° C., temperature raised to 150° C., total heating time 1 hour.

(B) Composition heated for ½ hour at 140° C.

(C) Composition introduced into a mould preheated to 110° C. temperature raised to 150° C., total heating time 1 hour.

(D) Composition heated for 1 hour at 140° C.

The relaxed modulus at 100% extension (MR 100) is a standard test and is normally regarded as giving a useful guide to the extent of vulcanization.

TABLE 1

| | Rubber | | Curing Agent | | | | | | | |
|---|---|---|---|---|---|---|---|---|---|---|
| Example | Type | Wt. (g.) | Type | Wt. (g.) | B (phr.) | Filler | Drying Agent | Cure | MR 100 (kg./cm.°) | Comments |
| 1 | Natural (RSS1) | 25 | TEDB | 0.485 | 0.3 | No | No | A | | Badly blown. |
| 2 | do | 25 | TEDB | 0.485 | 0.3 | No | Yes | A | 4.9 | Slightly blown. |
| 3 | do | 40 | TEB | 1.28 | 0.3 | Yes | Yes | B | 20.5 | Do. |
| 4 | do | 25 | TEDB | 0.485 | 0.3 | Yes | Yes | A | 19.8 | Do. |
| 5 | do | 25 | TMCB | 1.0 | 0.4 | No | No | B | | Sample blown. |
| 6 | do | 60 | TMCB | 2.4 | 0.4 | No | Yes | B | 6.6 | Acceptable.* |
| 7 | do | 40 | TMCB | 1.2 | 0.3 | Yes | Yes | B | 20.3 | Do.* |
| 8 | do | 25 | TEDCB | 0.725 | 0.3 | Yes | Yes | A | 27.0 | Satisfactory cure. |
| 9 | do | 25 | TEDCB | 0.725 | 0.3 | No | Yes | A | 6.1 | Do. |
| 10 | BR Phillips | 25 | TEDB | 0.162 | 0.1 | No | No | A | 6.0 | Very slightly blown. |
| 11 | BR Cis 4 | 25 | TEDB | 0.162 | 0.1 | No | Yes | A | 6.3 | Satisfactory cure. |
| 12 | BR 1203 | 25 | TEDCB | 0.242 | 0.1 | No | No | A | 4.1 | Slightly blown. |
| 13 | BR 1203 | 25 | TEDCB | 0.242 | 0.1 | No | Yes | A | 5.1 | Satisfactory cure. |
| 14 | SBR Phillips | 25 | TEDB | 0.162 | 0.1 | No | No | A | 6.0 | Slightly blown. |
| 15 | SBR Solprene | 25 | TEDB | 0.162 | 0.1 | No | Yes | A | 6.9 | Satisfactory cure. |
| 16 | SBR 1204 | 25 | TEDCB | 0.242 | 0.1 | No | No | A | 4.8 | Slightly blown. |

*See footnote at end of table.

TABLE 1—Continued

| Example | Rubber | | Curing Agent | | | Filler | Drying Agent | Cure | MR 100 (kg./cm.$^2$) | Comments |
|---|---|---|---|---|---|---|---|---|---|---|
| | Type | Wt. (g.) | Type | Wt. (g.) | B (phr.) | | | | | |
| 17 | SBR 1204 | 25 | TEDCB | 0.242 | 0.1 | No | Yes | A | 5.4 | Satisfactory cure. |
| 18 | SBR 1204 | 25 | TEDCB | 0.484 | 0.2 | No | Yes | A | 8.4 | Do. |
| 19 | EPT Dupont | 25 | TEDB | 0.324 | 0.2 | No | No | A | | Sample blown. |
| 20 | EPT Nordel | 25 | TEDB | 0.324 | 0.2 | No | Yes | A | 4.3 | Satisfactory cure. |
| 21 | do | 25 | TEDCB | 0.484 | 0.2 | No | Yes | A | 4.0 | Non-uniform appearance. |
| 22 | SBR Intol | 25 | TEDB | 0.324 | 0.2 | No | Yes | A | | Sample blown. |
| 23 | SBR 1500 | 25 | TEDCB | 0.484 | 0.2 | No | Yes | A | 5.3 | Do. |
| 24 | Natsyn | 25 | TEDB | 0.485 | 0.3 | No | No | A | | Do. |
| 25 | do | 25 | TEDB | 0.485 | 0.3 | No | Yes | A | | Do. |
| 26 | do | 25 | TEDCB | 0.725 | 0.3 | No | No | A | 3.8 | Satisfactory cure. |
| 27 | do | 25 | TEDCB | 0.725 | 0.3 | No | Yes | A | 5.1 | Do. |
| 28 | Natural (RSS1) | 25 | TPPB | 1.92 | 0.3 | Yes | Yes | C | 22.8 | Sample blown. |
| 29 | do | 12.5 | TPPCB | 1.075 | 0.3 | Yes | Yes | C | 32.3 | Satisfactory cure. |

* Volatile amine liberated.

NOTE.—Tensile strength No. 3, 226 kg./cm.$^2$; No. 6, 174 kg./cm.$^2$; No. 7, 245 kg./cm.$^2$.

Of the first 29 examples, Nos. 5, 6, 7, 8, 9, 12, 13, 16, 17, 18, 21, 26, 27 and 29 are within the scope of the present invention. Vulcanizates which have blown slightly or have a non-uniform appearance, while not preferred, may be adequate for some purposes.

Examples 1 to 9 show that, as the natural rubber samples used contained moisture, it was necessary to employ a drying agent. In the presence of a drying agent, use of the chloroborane complexes prevents the formation of hydrogen, which occurs when the borane complexes are used. The use of trimethylamine-chloroborane is not preferred, as the liberated amine caused the sample to swell out of the mould and to have an unpleasant odour.

Internal hydrogen elimination during vulcanization is not a feature with cis-polybutadiene rubber (Examples 10–13), styrene-butadiene rubber (Examples 14–18), and ethylene-propylene terpolymer (Examples 19–21), and these rubbers can therefore be cured satisfactorily by both borane and chloroborane complexes in the presence of drying agent when necessary.

"SBR Intol 1500" is an emulsion polymer and the vulcanizates from both borane and chloroborane complexes were blown even in the presence of drying agent (Examples 22, 23). The synthetic cis-polyisoprene used in Examples 24 to 27 was dry, but could only be satisfactorily cured by chloroborane complexes, due, presumably, to the internal hydrogen elimination mentioned above. Examples 28 and 29 relate to the use of phosphine complexes of borane and chloroborane with natural rubber, and again illustrate the advantage of a chloroborane complex.

In Examples 30 to 34, natural rubber (ribbed smoked sheets, grade 1) was mixed with triethylenediamine-bischloroborane (to provide 0.3 part by weight of boron per 100 parts by weight of rubber) and 6 parts by weight of a drying agent per 100 parts by weight of rubber. Curing conditions and comments on the vulcanizates are given below in Table 2.

TABLE 2

| Ex. No. | Rubber Wt. (g.) | Drying Agent | Cure | MR 100 (kg./cm.$^2$) | Comments |
|---|---|---|---|---|---|
| 30 | 25 | Molecular sieve type 4A. | D | | Badly blown. |
| 31 | 25 | Freshly ignited magnesium sulphate. | D | | Slightly blown. |
| 32 | 25 | Freshly ignited calcium oxide. | D | 5.9 | Satisfactory. |
| 33 | 12.5 | Calcium sulphate hemihydrate. | A | | Badly blown. |
| 34 | 12.5 | Phthalic anhydride | A | | Do. |

Molecular sieve type 4A is a synthetic zeolite particularly suited to absorb water. The drying agent must react chemically with the moisture to produce a product which is unreactive towards the chloroborane.

Tables 3 and 4 set out certain preferred compositions and the initial properties of vulcanizates prepared according to the invention from them. Proportions of ingredients are by weight.

TABLE 3.—COMPOUNDING INGREDIENTS

| Example | 35 | 36 | 37 | 38 | 39 | 40 | 41 |
|---|---|---|---|---|---|---|---|
| RSS1 | 100 | | 100 | 100 | 100 | 100 | 100 |
| Heveacrumb SMR 5L | | 100 | | | | | |
| HAF black | 50 | 50 | 50 | 50 | 50 | | |
| SRF black | | | | | | 50 | |
| Dutrex R | | 5 | 5 | | | 5 | |
| PBN | | 1 | 1 | 1 | 1 | 1 | 1 |
| Zinc oxide | | | | 5 | 5 | 5 | 5 |
| TEDCB (0.3 phr. of boron) | 2.89 | 2.89 | 2.89 | | | | |
| TECB (0.2 phr. of boron) | | | | 2.78 | 2.78 | 2.78 | 2.78 |
| Caloxol C31 | 6 | 6 | 6 | 6 | 6 | 6 | 6 |
| Cure: | | | | | | | |
| Time, minutes | 30 | 30 | 30 | 40 | 35 | 40 | 40 |
| Temp., ° C | 150 | 150 | 150 | 100 | 110 | 100 | 100 |

TABLE 4.—INITIAL VULCANIZATE PROPERTIES

| Example | 35 | 36 | 37 | 38 | 39 | 40 | 41 |
|---|---|---|---|---|---|---|---|
| Hardness (° BS) | 64 | 68 | 64 | 63 | 65 | 63 | 38 |
| Relaxed modulus, MR 100 (kg./cm.$^2$) | 19.1 | 21.8 | 24.8 | 17.5 | 20.5 | 18.8 | 4.5 |
| Tensile strength (kg./cm.$^2$) | 146 | 206 | 212 | 242 | 235 | 190 | 200 |
| M 100 (kg./cm.$^2$) | 39 | | 30 | 28 | 29 | 32 | 7 |
| M 200 (kg./cm.$^2$) | 125 | 128 | 90 | 93 | 99 | 96 | 11 |
| M 300 (kg./cm.$^2$) | | 195 | 159 | 168 | 179 | 150 | 15.5 |
| Elongation at break (percent) 235 | | 335 | 390 | 420 | 390 | 400 | 750 |
| Tear strength, maximum (kg./mm.) at 21° C | 1.24 | 1.30 | 1.40 | 1.45 | 1.75 | 0.99 | |
| Tear strength, maximum (kg./mm.) at 70° C | 0.96 | | | 0.81 | | | |
| Resilience (Lupke) (percent) | 71 | 67.5 | 68 | 67 | | 77 | |
| Abrasion loss, average (Akron) (cc./500 rev.) | 0.85 | | | .077 | | .121 | |
| Flex life (de Mattia) (kc. to grade B) | [1] 1,000 | [1] 1,000 | | 1,000 | | 1,000 | |
| Cut growth (kc. to 8 mm.) | | | | [2] | | | |
| Compression set (25%; 3d. at 21° C.) (percent) | 54 | 58 | | 69 | | 54 | 59 |
| Compression set (25%; 24 hr. at 70° C.) (percent) | | | | 95 | | 73 | 74 |
| Tension set (75% of EB for 10 min.) (percent) 30 min. relaxation | 9 | 9 | 9 | 17 | | 14 | 9 |

[1] Evidence of thermal degradation on reverse side of test piece.
[2] .2 mm. at 1,000.

Table 5 demonstrates the improved ozone-resistance which can be obtained by using chloroborane complexes as curing agents. A sample of carbon-black filled rubber was divided into two equal parts, one of which was vulcanized using conventional sulphur-containing agents (A), and the other of which was vulcanized using sufficient TEDCB to provide 0.3 phr. of boron (B). Similarly, a sample of unfilled gum was divided into two equal parts, one of which was vulcanized using conventional sulphur-containing agents (C), and the other of which was vulcanized using sufficient TECB to provide 0.2 phr. of boron (column D in Table 5). The vulcanizates were exposed at various strains to an atmosphere containing 25 p.p.h.m. of ozone at 30° C., and the extent of cracking with time assessed. The samples were divided into grades as follows.

Grades:

0=No cracking at ×10 magnification.
1=Cracking visible at ×10 to ×1.
2=Moderate cracking.
3=Severe cracking.
B=Sample broke.
ec=Edge cracks.
⊹=Edge cracks at ends only; otherwise one isolated crack.

It will be seen that the vulcanizates in columns B and D, prepared using TEDCB and TECB respectively, performed much better than the comparable vulcanizates in columns A and C respectively.

TABLE 5.—OZONE RESISTANCE

| | A | | | | | B | | | | |
|---|---|---|---|---|---|---|---|---|---|---|
| Hours Exposure | 24 | 48 | 54 | 119 | 153 | 24 | 48 | 54 | 119 | 153 |
| Strain, percent: | | | | | | | | | | |
| 5 | 2 | 2 | 2 | 3 | 3 | 0 | 0 | 0 | 0 | 0 |
| 10 | 3 | 3 | 3 | 3 | 3 | 0 | 0 | 0 | 2 | 2 |
| 15 | 3 | 3 | 3 | 3 | 3 | 0 | 2 | 2 | 3 | 3 |
| 20 | 3 | 3 | 3 | 3 | 3 | 2 | 3 | 3 | 3 | 3 |
| 30 | 3 | 3 | 3 | 3 | 3 | 3 | 3 | 3 | 3 | 3 |
| 40 | 3 | 3 | B | ---- | ---- | 3 | 3 | 3 | 3 | 3 |
| 50 | 3 | 3 | B | ---- | ---- | 3 | 3 | 3 | 3 | 3 |
| 60 | 3 | 3 | B | ---- | ---- | 3 | 3 | 3 | 3 | 3 |
| Critical Strain, percent | <5 | <5 | <5 | <5 | <5 | 15–20 | 10–15 | 10–15 | 5–10 | 5–10 |

| | C | | | | | | | | D | | | | | | | |
|---|---|---|---|---|---|---|---|---|---|---|---|---|---|---|---|---|
| Hours Exposure | 4 | 24 | 48 | 120 | 148 | 172 | 196 | 228 | 4 | 24 | 48 | 120 | 148 | 172 | 196 | 228 |
| Strain, percent: | | | | | | | | | | | | | | | | |
| 5 | 1 | 2 | 3 | 3 | B | ---- | ---- | ---- | 0 | 0 | 0 | 0 | 0 | 0 | 0 | 0 |
| 10 | 1 | 2 | 3 | 3 | B | ---- | ---- | ---- | 0 | 0 | 0 | 0 | 0 | 0 | 0 | 0 |
| 15 | 1 | 2 | 3 | 3 | B | ---- | ---- | ---- | 0 | 0 | 0 | 1 ec | 1⊹ | 1⊹ | 1⊹ | 1⊹ |
| 20 | 1 | 2 | 3 | 3 | 3 | B | ---- | ---- | 0 | 0 | 1 | 2 ec | 2 | 3 | 3 | B |
| 30 | 1 | 2 | 2 | 3 | 3 | 3 | 3 | B | 0 | 1 ec | 1–2 | 3 | 3 | 3 | 3 | B |
| 40 | 1 | 1 | 2 ec | 2 ec | 3 | 3 | 3 | B | 0 | 2 | 3 | 3 | 3 | 3 | B | ---- |
| 50 | 1 | 1 ec | 2 ec | 2 ec | 3 | 3 | 3 | B | 0 | 2 | 3 | 3 | 3 | B | ---- | ---- |
| 60 | 1 | 1 ec | 2 ec | 2 ec | 3 | 3 | 3 | B | 0 | 2 | 3 | 3 | 3 | B | ---- | ---- |
| Critical Strain, percent | 5 | <5 | ---- | ---- | ---- | ---- | ---- | ---- | >60 | 20-30 | 20–30 | 15–20 | 15 | 15 | 15 | 15 |

Table 6 illustrates the ozone protection afforded to a conventional natural rubber vulcanizate by a thin skin of natural rubber cured by an amine-chloroborane.

A sheet, 0.4 mm. thick, of a TECB gum compound was applied to both sides of a sheet of a CBS/S black stock, 1.2 mm. thick, and the laminate cured in a compression mould at 150° C. for 20 minutes. The chloroborane cured skin was perfectly bonded to the sulphur vulcanizate by this treatment.

Strips, 15 cm. by 1 cm., were cut from the laminated sheet, and from a control sulphur vulcanizate, strained to the extents indicated in Table 6 and held at these strains for 76 hours before being placed in an atmosphere containing 25 p.p.h.m. of ozone. The edges of the strips were strips were protected by a coating of a Hypalon lacquer. The grades of cracking at various time intervals are defined as for Table 5.

Compounds

TECB compound:

| | |
|---|---|
| RSS1 | 100 |
| ZnO | 20 |
| Caloxol | 6 |
| PBN | 1 |
| Boron | 0.2 |

S/CBS stock:

| | |
|---|---|
| RSS1 | 100 |
| HAF black | 50 |
| Dutrex R | 5 |
| ZnO | 5 |
| Stearic acid | 2 |
| S | 2.5 |
| CBS | 0.6 |

TABLE 6

| | Control, Unprotected S/CBS Black | | | | | S/CBS Black protected by TECB gum skin | | | | |
|---|---|---|---|---|---|---|---|---|---|---|
| Hours Exposure | 24 | 48 | 54 | 96 | 168 | 24 | 48 | 54 | 96 | 168 |
| Strain, percent: | | | | | | | | | | |
| 5 | 2 | 2 | 2 | 3 | 3 | 0 | 0 | 0 | 0 | 0 |
| 10 | 3 | 3 | 3 | 3 | 3 | 0 | 0 | 0 | 0 | 1 |
| 15 | 3 | 3 | 3 | 3 | 3 | 1 | 1 | 1 | 1 | 1 |
| 20 | 3 | 3 | 3 | 3 | 3 | 2 | 2 | 2 | 3 | 3 |
| 30 | 3 | 3 | 3 | 3 | 3 | 2 | 2 | 3 | 3 | 3 |

Table 7 shows that no detrimental effect occurs with a TECB cure when the temperature and/or time of cure is increased (the tensile strength and modulus remain virtually unaffected). The vulcanizable composition for Table 7 was as follows.

Compounding ingredients

| | |
|---|---|
| RSS1 | 100 |
| HAF Black | 50 |
| TECB (0.2 phr. boron) | 2.78 |
| Caloxol C31 | 6 |
| PBN | 1 |

TABLE 7

| Ex. | Cure temp. (° C.) | Cure time (min.) | Tensile strength (kg./cm.²) | Elongation at break (percent) | M 100 (kg./cm.²) | M 200 (kg./cm.²) | M 300 (kg./cm.²) |
|---|---|---|---|---|---|---|---|
| 42 | 120 | 10 | 237 | 460 | 23 | 74 | 147 |
| 43 | 120 | 20 | 250 | 450 | 27 | 84 | 160 |
| 44 | 120 | 30 | 242 | 420 | 27 | 87 | 165 |
| 45 | 130 | 10 | 252 | 445 | 27 | 86 | 161 |
| 46 | 130 | 20 | 254 | 440 | 26 | 90 | 166 |
| 47 | 130 | 30 | 248 | 430 | 27 | 89 | 167 |
| 48 | 140 | 10 | 243 | 435 | 26 | 87 | 166 |
| 49 | 140 | 20 | 245 | 415 | 27 | 91 | 171 |
| 50 | 140 | 30 | 253 | 430 | 25 | 89 | 170 |
| 51 | 150 | 10 | 230 | 400 | 25 | 85 | 162 |
| 52 | 150 | 20 | 240 | 407 | 25 | 90 | 172 |
| 53 | 150 | 30 | 250 | 420 | 27 | 91 | 170 |

The figure shows the variation of tensile strength with boron concentration for natural rubber vulcanizates containing 50 phr. of HAF black and cured with TMCB.

The vulcanized rubbers of the invention can be used for the same purposes as prior known vulcanized rubbers, e.g. in the manufacture in per se conventional manner of rubber articles where resistance to creep is not a vital property.

We claim:

1. Vulcanizable rubber composition comprising
(1) natural rubber or an olefinically unsaturated rubber prepared by solution polymerization and selected from the group consisting of polybutadiene, polyisoprene, styrene-butadiene copolymers, and terpolymers from ethylene-propylene-diene monomers, and
(2) a complex of monochloroborane $BH_2Cl$ with tertiary amine or triphenyl phosphine, said complex being present in an amount sufficient to provide from 0.05% to 0.5% by weight of boron based on the weight of the rubber to be vulcanized, with the proviso that the composition does not contain any appreciable quantity of any non-rubber other than water which is reactive towards the chloroborane with or without gas evolution.

2. A composition as claimed in claim 1, wherein calcium oxide is present as a drying agent.

3. A composition as claimed in claim 1 wherein the chloroborane is used in the form of an amine complex.

4. A composition as claimed in claim 3, wherein the amine complex is triethylenediamine-bischloroborane or triethylamine-chloroborane.

5. A composition as claimed in claim 1, wherein the proportion of chloroborane complex present provides from 0.2% to 0.4% by weight of boron on the weight of the rubber to be vulcanized.

6. A method of vulcanizing a natural or synthetic rubber, which method comprises heating the vulcanizable composition claimed in claim 1 for a time and at a temperature to effect vulcanization.

References Cited

UNITED STATES PATENTS 2,558,559 6/1951 Hurd et al. ______ 260—768 XR
3,225,017 12/1965 Seegman et al. _______ 260—79.1

FOREIGN PATENTS 1,382,668 11/1964 France.

JOSEPH L. SCHOFER, Primary Examiner
WILLIAM HAMROCK, Assistant Examiner

U.S. Cl. X.R.

23—358; 260—80.2, 80.7, 85.1, 94.7, 768, 770